Nov. 22, 1955 D. L. BENSON 2,724,743
ELECTRONIC REGISTER TRANSLATORS
Filed March 16, 1951 4 Sheets-Sheet 2

Inventor
David L. Benson,
by Hall & Houghton,
Attorneys

Nov. 22, 1955     D. L. BENSON     2,724,743
ELECTRONIC REGISTER TRANSLATORS
Filed March 16, 1951     4 Sheets—Sheet 3

Inventor,
David L. Benson,
by Hall & Hengleton
Attorneys.

United States Patent Office 2,724,743
Patented Nov. 22, 1955

2,724,743

ELECTRONIC REGISTER TRANSLATORS

David Livingstone Benson, West Ewell, England

Application March 16, 1951, Serial No. 215,980

Claims priority, application Great Britain March 22, 1950

21 Claims. (Cl. 179—18)

This invention relates to apparatus of the kind which is arranged to provide desired information from stored information by correlating the stored information with received stimuli.

An example of such apparatus is to be found in calculating or computing apparatus in which a stimulus in the form of the argument of a mathematical function is applied to the apparatus for the purpose of automatically calculating the value of the function which corresponds to the particular argument.

A further example of such apparatus is to be found in automatic or semi-automatic telephone systems in the form of register-translators to which a stimulus or signal consisting in a code by which an exchange or desired service is identified, is applied and which, on receipt of the stimulus, correlates items of information already stored thereon with the codes in such a manner as to emit, for example, the necessary switch settings designated by the code, the charge for a connection or service and the number of numerical digits which should follow the code.

Object

An object of the present invention is to improve register-translator equipment for use in automatic or semi-automatic exchanges by the use of improved electronic techniques with resulting greater reliability in operation and reduction of production and maintenance costs.

Subject matter improved (1) It is well known that the function of the register translator is to receive all or part of the exchange code and the called subscribers number as dialled by a caller and to change all or part of the dialled-in digits into another signal or series of signals which are best adapted to route the call towards its final destination. Register translator equipment at present in use translates the code portion of the called number into signals which direct the call to the wanted exchange or service or advance the call to a point in the telephone network where further register-translator means are enabled to advance the call still further towards its destination. The numerical portion of the called number is not, in general, translated, and is stored by the register until such time as the code translation has advanced the call to the required exchange.

Known register-translator apparatus for automatic or semi-automatic telephone systems consist of three parts. The first part, called the register, receives and stores the dialled information while the second, the translator, commonly takes the form of a cross connection field of wires which form a permanent memory of the information defining the route, and in some cases the charge for each code which may be dialled. The third part is the sender or counter, which accepts information from the translator or from the numerical storage circuits and controls the setting of subsidiary apparatus in accordance with the information received for sending.

According to the present invention apparatus for providing desired information from stored information, or automatic telephone exchange equipment having two or more registers, includes a common translator which serves as a reference memory of all the information relating to all the items or codes for which its associated registers may require information and further includes means whereby the said registers may be offered sequentially individual access to the translator for a period of time during which a single register may make application to the translator.

(2) According to a modification of the invention, means are provided to enable the time period during which a register may make application to the common translator to overlap the time period during which any register may make application to the register. Such provision enables an application from a register to a common translator to commence while the translator is completing the operation of supplying a translation in response to a preceding application from any register.

(3) According to a further modification of the invention two or more translators operating effectively as a tranlator common to two or more registers may be provided in order to reduce or eliminate the consequence of an incorrect translation from one translator.

(4) It is well known in register-translators for applications for translations to be made to the common translator after fixed numbers of complete digits have been received and stored in the register. It is a feature of this invention that such applications may be made after the storage in the register of each or any of the incoming digits.

(5) In particular equipment according to the invention and relating to register-translators for use in automatic or semi-automatic telephone exchanges the register includes electronic storage elements for the storage of the information comprising the codes and numerical information defining the exchange and number or the service required by the caller. Each storage element relating to the codes is connected to a switch element and each such switch element is joined over commoned wires to similar switch elements in other registers and to the common translator. Each register is also connected to the common translator by means of further switch elements and commoned wires and by means of commoned control wires.

(6) It is a feature of the invention that the translator comprises a pulse generating and a pulse distributing circuit, the two circuits co-operating to produce a continuously repeating series of pulses. Each series of pulses occur within a period of time during which a register may make application to the translator and each series of pulses comprises a number of pulses spaced in time and appearing on separate wires.

(7) It is a further feature of the invention that the aforesaid series of pulses act on the equipment such that the first pulse of the series causes information stored in one particular register to be transferred to the common translator, the intermediate pulses of the series cause the translator to select, by one or more operations, the translation appropriate to the applied signals, and the final pulse of the series causes the translation to be transferred into the register from which the application originated, it being understood that should the aforesaid particular register not require application to the translator the series of pulses are caused to be ineffective.

(8) It is a further feature of the invention that elements comprising the translator may be arranged in different ways and that one such arrangement may be adopted for one particular application of the invention such that the numbers of elements required in the translator is a minimum.

(9) It is a common requirement in switching or counting devices that digital information should be stored in static storage devices. Often the separate digits relating to a particular number are each stored in $n$ separate simple counters operating in such a scale, for example binary or denary, as may be suitable for the particular application. Usually each such counter counts a limited number, say $x$, and it is a common requirement of the switching art that the $n$ items of digital information each stored separately on counters reading up to, say $x$, should be combined as simply as possible to give a unique output for each of the $x^n$ combinations. It is one of the features of this invention to show how requirements of such a nature may be performed by an electronic circuit arrangement in which, of information stored in, say, $n$ devices, each device marking one of, say, $x$ values, a unique path may be established for each of the $x^n$ possible combinations by means of a pulse system arranged to build up a path to the required point in one or more stages by means of simple circuit elements in such a manner that if necessary numbers of such paths may be coupled together with the minimum of interference with other paths.

(10) It is a further feature of the invention that when employed in the preferred form the majority of elements comprise cold cathode tubes and therefore the power consumed by the equipment is a minimum.

*First illustrative embodiment*

In order that the invention may be more clearly understood and readily carried into effect a register translator system designed to operate in accordance therewith together with modifications thereof will now be described in greater detail by way of example with reference to the accompanying drawings in which.

For the purpose of describing the application of the invention it is assumed that the information supplied to the register is either in the form of three code digits signifying the required exchange followed by numerical digits denoting the wanted subscriber's number in that exchange or consists of a one, two or three digit code not followed by a subscriber's number and indicating for example a special service such as operator assistance, it being understood that this is an example only and that the invention is equally applicable to other number arrangements.

*Register and sender*

The register and sender are similar to those described in the specification of co-pending patent application Ser. No. 208,284, filed January 29, 1951, but pertinent elements of the register will be described herein in order to give a clear understanding of the present invention.

Figure 1:
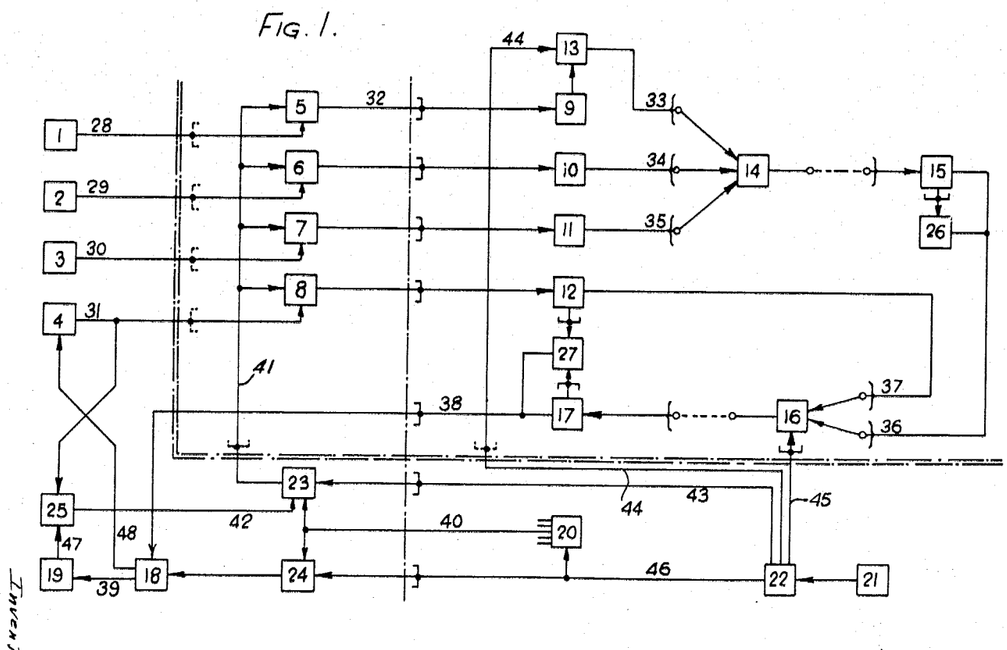
Fig. 1 is a block schematic diagram representing the major items of apparatus forming the translator and such items of apparatus forming the register as are required to provide a clear understanding of the invention.

In the register digital information is stored in a number of cold cathode counters, one digit being stored in each counter in a manner familiar to those skilled in the art. Each counter storing digital information in a decimal system will have, typically, eleven cold cathode tubes, one indicating that no information has been received and the other ten indicating the value dialled. Ten connections may therefore be taken from such a counter and a particular potential on one of the ten wires will indicate the value recorded by the counter. In Fig. 1 blocks 1, 2 and 3 represent three such counters recording the first, second and third code digits dialled into the register and lines 28, 29 and 30 each represent ten connections from each counter.

Block 4 represents a sequence control counter which controls the sequence of sending operations performed by the register. One cold cathode tube is provided for each operation which may be required and as each operation is effected the counter is stepped to the next tube. One or more operations may be omitted by striking the cold cathode tube associated with the next operation which is required. Thus if the maximum number of translation digits which the register will be required to send is N, then N of the tubes provided in the sequence control counter will control the sending of translations and N connections may therefore be taken from the counter, a particular potential on one of the N wires indicating which translation digit must be sent next. Line 31 represents six such connections from the sequence control counter, N being taken as six for example.

Block 19 represents the sender counter which may consist of eleven cold cathode tubes. The first tube, which will be referred to as the normal tube, is conducting while the register is in use except during the operation of sending a digit. If it is desired to send, for example, the digit five then the fifth tube away from the normal tube is struck which results in the normal tube being extinguished. This action then communicates a signal to the impulse generator (not shown in Fig. 1) which may then send impulses on the register output. As each impulse is sent on the register output the impulse generator also provides an impulse which steps the sender counter one tube nearer the normal tube. Thus after five impulses the normal tube reconducts and a signal is communicated to the impulse generator to stop sending. Ten connections may therefore be taken to the strikers of the sender counter tubes, one for each digit, and an impulse applied to one of the wires will result in the appropriate digit being sent by the register.

*Translation demand means*

When the register requires translated information from the common translator the sequence control counter, 4, will have one of the six send-translation tubes conducting and a particular potential will appear on one of the six wires represented by line 31 which is connected to the element 25. In addition the normal tube of sender counter 19 will be conducting and a connection from this tube represented by line 47 is joined to the element 25. Element 25 detects when reference to the common translator is required and provides a signal to the pulse gate 23 via line 42 when reference is required. Pulse gate 23 cannot open unless this signal is provided.

*Allotter*

Element 20 represents the allotter counter. The allotter counter comprises as many cold cathode tubes as there are registers associated with the common translator and each tube is directly associated with one particular register by a wire such as wire 40. The counter is connected to form a ring, only one tube is conducting at any instant and thus only one wire such as wire 40 will be connected to a tube which is conducting. The wire 40 is connected to the pulse gates 23 and 24 and the pulse gates 23 and 24 cannot open unless the associated tube in the allotter counter is conducting. Thus only one register at a time can have its individual pulse gates 23 and 24 open.

*Timing pulse supply*

Element 21 represents the basic pulse generator in the translator. This is connected to a pulse distributing element 22 which provides a constantly recurring series of four pulses spaced in time. The first of the four pulses appears on wire 43, the second pulse on wire 44, the third pulse on wire 45 and the fourth pulse on wire 46.

Connecting to translator

Considering one series of pulses, the first pulse on wire 43 is connected to the pulse gate 23 of each and every register. Only one register will have its allotter tube conducting and hence only one pulse gate 23 can be open, and this one only if that particular register requires translated information as indicated by the element 25. Assuming that the allotted register does require translated information, then the pulse on wire 43 will pass through the pulse gate 23 to wire 41 and be applied to the elements indicated by blocks 5, 6, 7 and 8. Block 5 represents a group of ten transfer switches, each controlled by one of the ten connections from the first code counter 1. Block 6 represents a similar group of ten transfer switches but associated with the second code counter 2 and block 7 represents ten transfer switches associated with the code counter 3. Block 8 represents six transfer switches each controlled by one of the connections from the sequence control counter 4. The ten connections from the outputs of the ten transfer switches represented by block 5 are represented by the line 32. These ten connections are commoned with similar points on each and every register associated with the translator and fed into block 9 in the translator. Block 9 represents ten cold cathode memory tubes, the ten incoming connections being connected to the tubes so that an impulse appearing on one of the ten wires, and coming from any register, will strike the corresponding tube in block 9. In a similar way the ten outputs from block 6 are connected to ten tubes in block 10, ten outputs from block 7 are connected to ten tubes in block 11 and six outputs from block 8 are connected to six tubes in block 12. Wire 41 is connected to the input of all ten transfer switches represented by block 5. When the pulse appears on wire 41 one of the ten switches will be open according to the digit stored in the first code counter 1 and the pulse on wire 41 will be relayed through this switch on to one of the ten common connections into block 9 where the appropriate tube will be struck. Thus the information recorded in the first code counter 1 is transferred to a memory tube in block 9 in the common translator. In a similar manner the same pulse on wire 41 transfers the information in code counter 2 via a transfer switch in block 6, to a memory tube in block 10, the information in code counter 3 via a transfer switch in block 7, to a memory tube in block 11 and the information in the sequence control counter 4 via a transfer switch in block 8, to a memory tube in block 12.

Translating

The second pulse of the series on wire 44 is fed into block 13 which represents ten pulse gates. Each gate is controlled by one of the ten tubes represented by block 9 which memorise the first code digit. Thus the pulse on wire 44 will appear on one of the ten wires represented by line 33 to indicate the first code digit value. Line 34 represents ten wires connected to the ten tubes represented by block 10 which memorise the second code digit. One of these wires will be at a particular potential to indicate the second code digit value. Likewise line 35 represents ten wires one of which will be a particular potential to indicate the third code digit value. Block 14 represents one of a number, in this case, say 1000 individual code point switches. Each switch has three input connections and one output terminal and is associated with one particular three digit code. The first input is connected to one of the ten wires represented by line 33 according to the first code digit value which the switch represents; the second input is connected to one of the ten wires represented by line 34 according to the second code digit value which the switch represents and the third input is connected to one of the ten wires represented by line 35 according to the third code digit value which the switch represents. The pulse which appears on one of the ten wires represented by line 33 will be connected to one of many, in this case, say 100, individual code point switches but only one of these switches will have the particular potential on the other two input connections. This one switch operates when the pulse arrives on the first input connection and the pulse will be relayed on the output terminal. In a particular arrangement block 15 represents a number of translation memory tubes, one tube being provided for each different group of translated information which the translator may be required to provide. An input terminal is provided for each tube and this terminal is connected to the tube striker so that an impulse appearing at the terminal causes the associated tube to strike. Thus there are a number of code point switches each separately associated with one particular code, and a number of translation memory tubes each associated with one particular group of translated information. The output terminals of the code point switches are correlated with the input terminals of the translation memory tubes by means of cross-connections so that an impulse emerging from a particular code point switch strikes the appropriate translation memory tube.

In many cases it will happen that one particular translation memory tube is appropriate to more code point switches than any other tube. An economy of equipment may be made if all the code point switches associated with this particular memory tube are omitted and the memory tube replaced by the element 26. Element 26 has a common connection to all translation memory tubes and detects if any tube is conducting. The output of element 26 provides a potential such that if any translation memory tube is conducting the output simulates a memory tube which is not conducting whilst if no translation memory tube is conducting the output simulates a memory tube which is conducting.

Translation output

Line 36 represents a number of wires from the translation memory tubes, one wire being provided for each tube, and also one wire from the element 26. One of these wires will be at a particular potential to indicate which group of translated information has been selected. Line 37 represents six wires from the memory tubes, 12, and a particular potential on one of the wires indicates which translation digit is required. Block 16 represents one of a number of translation point switches each of which has three input connections and an output terminal and is associated with one particular translation point, i. e. each group of translated information consists of a number of items of information, for example, digits, and each such digit forms a translation point. The first input is connected to wire 45 on which the third pulse of the series appears, the second input is connected to one of the wires represented by line 36 according to the group of translated information which the switch represents and the third input is connected to one of the wires represented by line 37 according to the translation digit which the switch represents. The pulse which appears on wire 45 is connected to all translation point switches but only one of these switches will have the particular potential on the other two inputs. This one switch operates when the pulse arrives on wire 45 and the pulse will be relayed on the output terminal.

Block 17 represents a number of translation value memory tubes, one for each different translation value which the translator may be required to provide. For example, the register may be required to provide the numerical value of a digit, requiring ten such tubes. The translator may also be required to provide the register with auxiliary information or instructions which may or may not be in the form of extra digital information. It is well known for example, in the case of register-translators for use in a telephone system that instructions such as "send spare code signal" or "commence relaying dialled information" or "no further sending required" may have to be sent and one or more additional translation value memory tubes would be required for these indications. Thus there are a number of translation point switches each associated with one particular translation point, and a number of translation value memory tubes each associated with one particular translation value. The output terminals of the translation point switches are correlated with the input terminals of the translation value memory tubes by means of cross-connections so that an impulse emerging from a particular translation point switch strikes the appropriate translation value memory tube.

In many cases it will be the fact that one particular translation value memory tube is appropriate to more translation point switches than any other tube. An economy of equipment may be made if all the translation point switches associated with this particular memory tube are omitted and the memory tube replaced by element 27. Element 27 has a common connection to all translation value memory tubes and a common connection to all memory tubes represented by block 12. The output of element 27 is such that if any translation value memory tube is conducting the output simulates a memory tube which is not conducting, whilst if no translation value memory tube is conducting the output simulates a memory tube which is conducting, provided that one of the memory tubes represented by block 12 is conducting. The latter requirement is one of the possible ways of preventing element 27 providing a signal when the register allocated to the translator does not in fact require translated information.

Line 38 represents a number of wires from the translation value memory tubes, one wire being provided from each tube and also one wire from the element 27; all the wires represented by line 38 are connected to block 18 of each and every register and one of these wires will be at a particular potential to indicate which translation value has been selected. Block 18 represents thirteen transfer switches each controlled by one of the thirteen wires connected to each and every register and represented by line 38. In each and every register one of the thirteen switches will open according to the translation value memory tube which is conducting.

*Supplying translation to register*

The fourth pulse of the series generated at 22 appears on wire 46 and is connected to the pulse gate 24 of each and every register. Only one register will have its allotter tube conducting and hence only one pulse gate 24 can be open. If a particular register had pulse gate 23 open when the first pulse of the series arrived then the same register will have pulse gate 24 open when the fourth pulse of that series arrives. Thus the pulse which originated on wire 46 passes through the pulse gate 24 of the register which originated the interrogation of the translator and is relayed on the output of one of the thirteen transfer switches 18. If the translation value is in respect of digital information the resultant impulse will be on one of ten wires represented by line 39 and connected to the sender counter 19 which will cause the register to send the appropriate digit as described previously. If the translation value is in respect of sequence information the resultant impulse will be on one of the three wires represented by line 48 and connected to the appropriate sequence control counter tube which will strike. This will result in the sequence control counter selecting the appropriate operations as described previously.

The fourth pulse of the series is also connected to the allotter counter 20 which takes one step and thus allocates the next series of pulses from element 22 to another register. Between the fourth pulse of one series and the first pulse of the next series all cold cathode tubes in the common translator are extinguished in preparation for the next interrogation.

*Circuit elements*

Fig. 2 shows some of the circuit elements employed in the arrangement which has been described. Fig. 2a is an example of the memory tube employed in the register (Fig. 1, blocks 1, 2, 3 and 4). The output potential is earth when the tube is not conducting and is a preferred positive potential when the tube is conducting. Fig. 2b is an example of the transfer switch employed in the register (Fig. 1 blocks 5, 6, 7, 8 and 18). The operating pulse is positive and applied to a cold cathode diode via a capacitor 2C2. If the input potential on the resistor 2R2 is earth then the pulse is unable to strike the diode but if the input is at the preferred positive potential the added pulse causes the diode to strike and the pulse appears at the output. As a cold cathode diode presents a high impedance when not glowing, many outputs such as that from Fig. 2b may be connected together and to the input of one circuit such as Fig. 2c. Fig. 2c in an example of the memory tube employed in the translator (Fig. 1 blocks 9, 10, 11, 12, 15 and 17). The striker is connected via resistor 2R3 and 2R4 to a potential somewhat less than the breakdown potential of the striker-cathode gap. Resistor 2R5 connects the input to a potential $v$ to suit the requirements of the type of switch element connected to the input. When a pulse, or impulse, appears at the input it is connected to the striker by the capacitor 2C3 and resistor 2R4 and if the pulse is of sufficient amplitude the tube will strike. Resistor 2R4 prevents excessive striker current when the tube strikes. The output potential is earth when the tube is not conducting and is a preferred positive potential when the tube is conducting. The tube is extinguished by reducing the H. T. supply potential until the tube is de-ionised. Fig. 2d is an example of the switch employed in the translator (Fig. 1 blocks 14 and 16). It is similar to Fig. 2b except that in addition to a capacitor 2C4 two resistors 2R6 and 2R7 are provided and both resistor input connections must be at the preferred positive potential for the pulse to strike the diode. Fig. 2e is an example of a tube in the sender counter in the register (Fig. 1 block 19) and has input connections including a capacitor 2C7 and resistors 2R8, 2R9 and 2R10. Operation is similar to the element Fig. 2c.

*Alternative arrangements*

Figure 3A:
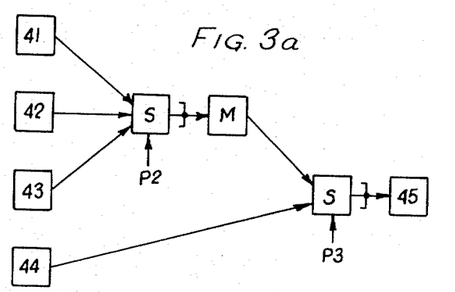
Fig. 3a is a simplified block key diagram of the apparatus shown in Fig. 1.
Figures 3B, 3C:
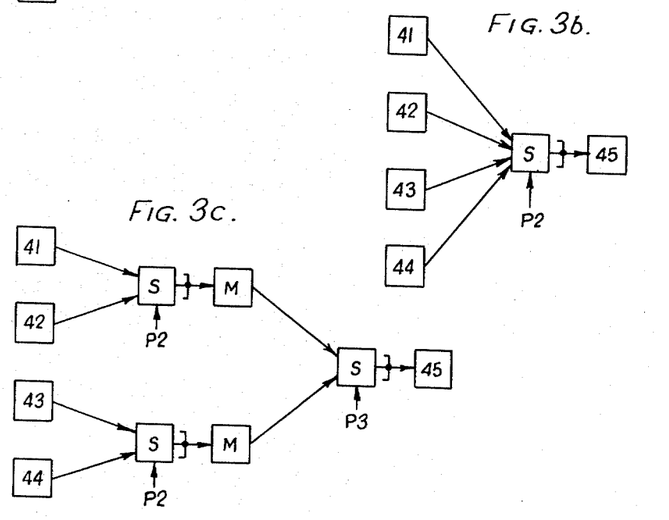
Figs. 3b, 3c and 3d are simplified block diagrams showing alternative ways in which the components forming the translator may be arranged.
Figure 3D:
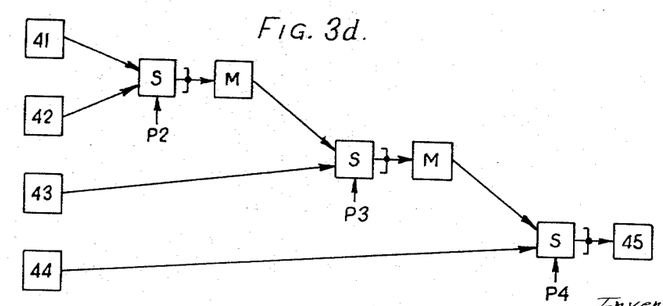

Fig. 3a is a simplified block diagram of the more significant of the components of the translator shown in Fig. 1 and will serve as a key diagram to the alternative arrangements of the translator shown in Figs. 3b, 3c and 3d. In each of these figures, blocks 41, 42, 43, 44 and 45 correspond respectively to the blocks 9, 10, 11, 12 and 17 in Fig. 1. The blocks S represent switching elements such as those included in blocks 14 and 16 in Fig. 1 and the blocks M represent groups of memory tubes such as those included in blocks 15 and 17 in Fig. 1.

The various stages of switching elements are operated by time spaced pulses applied to leads marked P2, P3 and P4, the numeral suffixes indicating the order of operation. The possible alternative arrangements shown in Figs. 3b, 3c and 3d may be preferable in various applications of the invention. In some arrangements there may be more or less groups of interrogating information than the four groups shown in these figures and with more than four groups, the number of possible arrangements increases so that the range of arrangements within which selection may be effected to provide the greatest advantages is extended.

In some applications of the invention it may be possible to ascertain the desired result without reference to all groups of information and for example in the arrangement described with reference to Fig. 1 it may be the case that all code point switches associated with one particular first code digit value will be connected to the same translation memory tube. When this occurs, all such code point switches may be omitted except one which will represent them all and this one is connected so that it responds to the first code digit value irrespective of the second or third code digit values. Similarly it can be arranged that one code point switch responds to a particular first and second code digit value irrespective of the third code digit value, and so on.

Figure 2A:
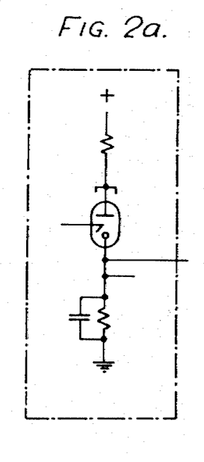
Figs. 2a to 2e show a preferred circuit arrangement of the individual switching elements.
Figure 2B:
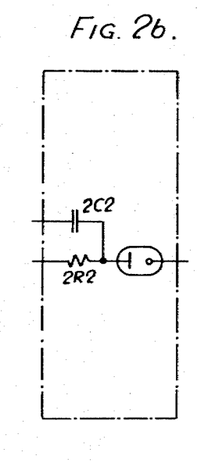
Figure 2C:
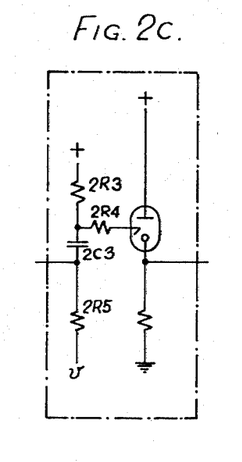
Figure 2D:
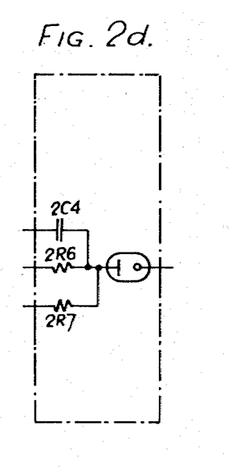
Figure 2E:
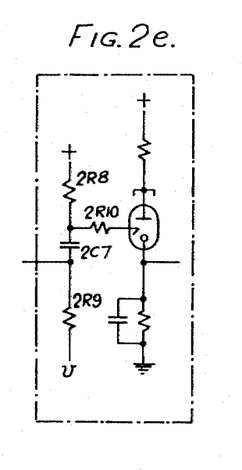

Fig. 3b shows a switch element S with four input connections. This is achieved by increasing the number of commoned resistors such as 2R6 and 2R7 in Fig. 2d, from two to three. Such an element could be employed in Fig. 1 block 14, the three resistors each being connected to one of the outputs of blocks 9, 10 and 11 respectively. By this means the equipment in block 13 may be omitted and the wire 44 connected to the capacitors corresponding to 2C4 of Fig. 2d, of all code point switches 14. Such an arrangement has the disadvantage that every code point switch has an additional connection and resistor and this may limit the physical size to which the unit may be reduced. The number of resistors which may be joined together and thus give an increased number of control points is limited amongst other things by the voltage change on each input, the accuracy of components and the accuracy of the striking voltage of the cold cathode diode. If the cold cathode diode is replaced by a rectifier, this limit is improved but the number of switch outputs which may be connected together is limited by the reverse characteristics of the rectifier. The best form of such an arrangement would include a hard valve diode, although this would involve heater current and the number of resistors which may be joined together would then be limited by the pulse amplitude required to strike the succeeding memory tube. The pulse amplitude required could be reduced by employing a hard valve trigger circuit for the memory tubes. This would also increase speeds of working although it would involve heater current. Alternatively the operating values for a valve connected as shown in Fig. 2c could be altered so that the striker is connected to a potential sufficiently high to ensure that the striker-cathode gap conducts, and resistor 2R3 is altered so that the resultant current is insufficient to fire the main gap. By this arrangement the operation of the element is made independent of the striking voltage of the tube so that a very small input pulse will fire the main gap of the tube. Used in conjunction with a rectifier type of switch this arrangement would permit many resistors to be joined together and thus provide many input control connections to the switch.

In some applications it may be the case that each memory tube is never associated with more than one switch element. In this case the switch element may be combined with the tube, the cold cathode diode or rectifier omitted and the swtich resistor-capacitor network connected to operate directly on to the memory tube striker.

From the circuits described with reference to Figures 2a to 2e it may be observed that the invention is suitable for construction by mass production methods. For example the element Fig. 2b may be identical with the element Fig. 2d and two resistor inputs of the latter being joined together to form one input.

The method by which any requisite number of cold cathode tubes such as those represented in Figs. 2a–2e may be connected for operation are well known to those skilled in the art but typical circuit arrangements are described in the specification of co-pending patent application Ser. No. 208,284, filed January 29, 1951 and shown in the drawings accompanying that specification.

*Overlapping use of translator*

Figure 4:
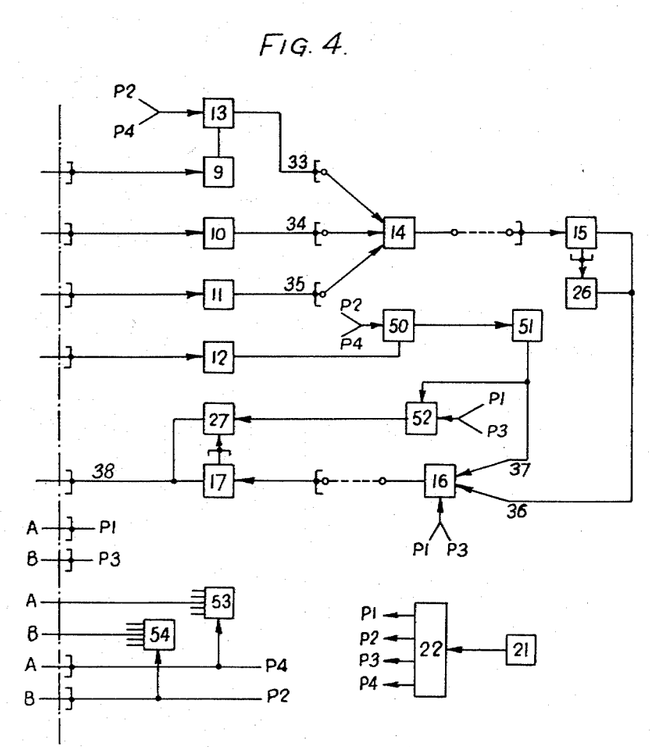
Fig. 4 is a more detailed block diagram of a particular alternative arrangement of a translator.

In order to ensure full employment of the translator, it may be arranged that the time periods during which a register may make application to the translator are in fact overlapped so that an application from one register can commence while the translator is completing the previous application. Fig. 4 of the drawings from which the register has been omitted shows a modified arrangement of the translator in which elements similar to those shown in Fig. 1 retain the same references and additional or modified elements provided to facilitate the fuller use of the translator are identified by references numbered upwards from 50.

The arrangement of the translator in Fig. 4 differs from that of Fig. 1 in the following respects. The registers to be served by the translator are divided into 2 groups identified as A and B and certain connections to the common translator are varied according to which group the register belongs. The allotter corresponding to allotter 20 in Fig. 1 is divided into two parts namely the allotter element represented by block 53 for the A group of registers and allotter element represented by block 54 for the B group of registers. One register in each group may be allotted to the translator at any given time.

The pulse wires leading from the distributor 22 and identified by the references P1, P2, P3 and P4 are rearranged and the elements to which these pulses are applied have leads also identified by these references. For convenience, the pulses themselves will be referred to as pulses P1, P2 etc. Again in Fig. 4, additional switching elements represented by the blocks 50, 51 and 52 are provided and their function will be referred to in the succeeding description.

The operations performed in the arrangement of Fig. 4 on an occurrence of the successive pulses distributed by the elements 22 are as follows. On the occurrence of pulse P1, the high tesion supply to the memory tubes in the blocks 9, 10, 11, 12 is switched on, by, for example, an electronic switch actuated by the pulse or a pulse derived from the distributor for this purpose. The use of switching pulses for controlling a high tension supply is described in the specification of co-pending patent application Ser. No. 208,284, filed January 29, 1951. The information stored by the counters in blocks 1, 2, 3 and 4 in the allotted register in group A is then transferred to the blocks 9, 10, 11 and 12 through the transfer switch blocks 5, 6, 7 and 8 the pulse gate 23 being operated to pass the pulse P1 as already described with reference to Fig. 1 in connection with the pulse on lead 43.

On the occurrence of pulse P2, the high tension supply to the tubes in blocks 15 and 51 is switched on and the application of this pulse to block 13 causes the information stored by the memory tubes in blocks 9, 10 and 11 to be transferred to block 15 through a code point switch in block 14. Pulse P2 acting also on the transfer block 50 causes information stored in the memory block 12 to be transferred to block 51. The high tension supply to the tubes in blocks 9, 10, 11 and 12 is then switched off to enable the tubes to de-ionise.

On the occurrence of pulse P3, the high tension supply to the translation value memory tubes in block 17 and to the detector block 27 is switched on and the application of this pulse to the translation point switches in block 16 causes the information stored by the memory tubes in block 15 or the detector 26 and the block 51 to be transferred to the memory tubes in block 17. The pulse P3 is also applied to the block 52 to cause information stored by the elements in block 51 to be transferred to the detector block 27 in such a form that the latter will not operate unless suitable information is received. It has already been explained that the block 27 is prevented from providing a signal when the resister allotted to the translator does not in fact require translated information. The high tension supply to the tubes in blocks 15 and 51 is next switched off to enable these tubes to de-ionise and the high tension supply to the tubes in blocks 9, 10, 11 and 12 is switched on again with the result that the information stored in the counters in blocks 1, 2, 3 and 4 in the register allotted in group B is transferred to the blocks 9, 10, 11 and 12 in a similar manner to that already described.

On the occurrence of pulse P4, the information stored in the memory block 17, or detector block 27 is transferred to the register from which the application for a translation originated. The pulse is transmitted by the pulse gate 24 by the allotter 53 and operates a transfer switch 18 of the register referred to. The high tension supply to the tubes in blocks 17 and 27 is switched off to enable these tubes to de-ionise and the high tension supplied to the tubes in blocks 15 and 51 is switched on. The pulse P4 applied to the same lead connected to the pulse gate block 13 as that to which pulse P2 is applied so that either of these two pulses acts on the pulse gate block, operates the latter and causes the information stored by the blocks 9, 10 and 11 to be transferred to the translation memory tube block 15. The pulse P4 also applied by the common lead with pulse P2 to block 50, operates the latter to cause the information stored by the memory block 12 to be transferred to the block 51. The high tension supply to the tubes in blocks 9, 10, 11 and 13 is switched off to enable the tubes to de-ionise and the pulse applied to allotter 53 causes the next register in group A to be allotted to the translator.

On the next occurrence of pulse P1, the high tension supply to the tubes in blocks 17 and 27 is switched on, the pulse applied to the translation point switch block 16 by a lead to which pulse 3 is also applied operates a point switch and causes information stored in the memory tube block 15 or detector 26 and block 51 to be transferred to the translation valve memory tube block 17. The pulse P1 applied by a lead common also to pulse P3, the block 52 causes the information in block 51 to be transferred to block 27 as already described. The high tension supply to the tubes in blocks 15 and 51 is switched off and that to the tubes in blocks 9, 10, 11 and 12 is switched on. The information stored in the counter blocks 1, 2, 3 and 4 in the new register now allotted in group A is transferred to the memory tube blocks 9, 10, 11 and 12 as already described.

On the next occurrence of pulse P2, the information stored in the block 17 or 27 is transferred to the register in group B from which the application for the translation originated. The pulse passes through pulse gate 24 marked by allotter 54 and then operates a transfer switch in block 18 of the register referred to. The high tension supply to the tubes in blocks 17 and 27 is switched off and that to the tubes in blocks 15 and 21 is switched on. The pulse P2 operates the pulse gate block 13 and causes information stored in blocks 9, 10 and 11 to be transferred to block 15 via the gate point switch block 14. The pulse is also applied to block 50 to cause information stored in the memory block 12 to be transferred to block 51. The high tension supply to the tubes in blocks 9, 10, 11 and 12 is switched off and the pulse P2 applied to the allotter 54 causes the next register in group B to be allotted to the translator.

It is thought that the operations resulting on occurrence of the succeeding pulses will be evident from the foregoing and it will be seen that applications for translations are taken alternately from each group of registers and calls follow each other through the translator as quickly as is permissible. It will now be appreciated that the additional elements represented by blocks 50, 51 and 52 are introduced to pass forward the information in block 12 as the memory tubes in that block are required for the next call.

*Parallel translators*

In order to avoid wrong connections being set up due to an incorrect result from a translator, two translators can be employed operating simultaneously so that an incorrect translation would be trapped. This principle may be extended and three translators employed so that an incorrect result is detected while at the same time the register may complete the call correctly. Arrangements for providing these facilities will now be described with reference to that portion of Fig. 1 within the double chain dotted line. The equipment above and to the right of the double chain dotted line includes the register-to-translator coupling devices and all the translator except the pulse generating equipment and the allotter. This equipment may be duplicated to ensure that an error in this part of the equipment is not passed into the register. All the connections to the two sets of equipment are commoned except the connection represented by line 38 to which reference will be made later.

When pulse P1 appears on wire 43 it is passed on to wire 41 in the allotted register. Wire 41 is commoned to both duplicated equipments and therefore the pulse P1 causes the information stored in the counter blocks 1, 2, 3 and 4 to be transferred through the transfer switch blocks 5, 6, 7 and 8 to the memory blocks 9, 10, 11 and 12 in both the duplicated equipments. Each equipment then derives the translation value independently but in synchronism and presents the result to separate wires (line 38). These separate wires are combined in the transfer switch block 18 of each and every register. It has been previously stated that the thirteen electronic transfer switches contained within block 18 may be of the form shown in Fig. 2b. In Fig. 2b, the resistor 2R2 is controlled by the potential on line 38 and the capacitor 2C2 is controlled by the impulse from the pulse gate 24 in Fig. 1. In the arrangement now being described the switches in block 18 are altered to that shown in Fig. 2d and each resistor is connected to the appropriate wire, line 38, one resistor for example 2R6 being connected to one translator and the other resistor e. g. 2R7, to the other translator. The operating potentials are so proportioned that the impulse applied to the capacitor 2C4 from the pulse gate 24, can only fire the called cathode diode if a signal is received from both translators. If the two translators produce different results, then two of the switches in block 18 will each receive a signal on one resistor only and hence no signal will emerge from block 18.

In extending the principle as previously indicated, three translators, are provided and commoned together in a similar manner. The electronic switches in block 18 are now provided with three input resistors and the operating potentials are so proportioned that a signal on three or two of the three resistors will enable the diode to fire when an impulse is applied to the capacitor.

Thus a result agreed by all three or by two of the three translators will be passed into the register that is to say an incorrect result by one of the translators will be ignored.

In the case of the three translator arrangement, one translator may be inoperative, for example it may be switched out of connection for maintenance purposes and the equipment will then operate as a two-translator equipment. Either arrangement can be reverted to single translator operation and if all the wires represented by line 38 emerging from one of the idle translators are connected to a source of potential simulating the signal potential and thus constitute a permanent signal. This can be done by switching the potential supply to the cathode resistors of the storage tubes of the form shown in Fig. 2c in blocks 17 and 27.

It will be clear to those skilled in the art that equipment can be designed to monitor the wires represented by line 38 and to dictate when there is disagreement between translators. As this condition is transitory, it becomes a matter of choice as to what operation the monitoring equipment performs. It may be sufficient to record that a disagreement occurred by operating a counter. If it is desired to locate the source of disagreement as nearly as possible then the monitoring equipment, on detecting disagreement can pass a signal synchronous with pulse P4 into the allotted register so that when the register has completed the call, the register does not clear the information stored, but signals an alarm. The maintenance staff can then locate the register and then the gate which resulted in the translator disagreement.

*Modifications and advantages*

It will be apparent that in specific arrangements of apparatus for carrying out the invention, if desired, modifications may be effected to suit particular requirements and alternative arrangements of the components of the equipment may be adopted.

It will be seen from the preceding description that the switching elements employed are of simple form and of similar construction so that quantity production of the component parts of the equipment is facilitated with the consequent economy in expense. Again, the switching elements comprise few components and may be constructed to be of small dimensions so that many such elements may be assembled together to occupy a minimum of space.

Although the invention has been described in its application to automatic telephone exchange equipment, it may be applied to certain forms of calculating equipment for example of the type having a key board operated recorder or storage unit from which the recorded or stored items are transferred to the calculating part of the machine. In applying the present invention to calculating machines of the kind referred to, the recorder or storage unit would be replaced by the register as described in this specification and the items stored in the register would be transferred to a common translator operating as a computor from which the derived values would be transferred back to the register which made application to the common translator.

I claim:

1. In apparatus of the class described, in combination, a plurality of information storing registers, common translator means, said translator means including input means pulse-actuable to receive and retain for a period digit identifying information stored in a register, transfer switch means connecting each of said registers to said translator input means, pulse gate means for each register operable for permitting or preventing passage of an actuating pulse through its transfer switch means, means including a pulse generator for supplying actuating pulses to the several pulse gate means, means associated with each register for biasing its pulse gate means to block passage of actuating pulses therethrough except when said register contains stored information needing translation, and allotter means for biasing the pulse gate means of all such registers to block passage of actuating pulses therethrough, said allotter operating to sequentially remove its block from the pulse gate means of said registers one at a time.

2. A combination according to claim 1 in which the translator further comprises means connected to its input means for deriving a translation of information supplied thereto by said transfer switch means, and means operable to restore the input means of said translator to condition to receive data from another register transfer switch as soon as the translation is derived from the information previously transferred to said input means and before the translation thereof is disposed of.

3. A combination according to claim 1 in which the translator means comprises at least two translators connected to operate in parallel, said two translators having their outputs commoned, forwarding means connected to said commoned outputs, said forwarding means being operable only by the sum of concurring outputs of two translators.

4. A combination according to claim 1 in which the translator means comprises at elast three translators connected to operate in parallel, said three translators having their outputs commoned, forwarding means connected to said commoned outputs, said forwarding means being operable only by the sum of concurring outputs of two of said three translators.

5. Automatic telephone exchange apparatus comprising register translator means according to claim 1, in which each register comprises means for receiving and storing signals representing exchange identifying digits and signals representing subscriber station identifying digits, and in which the pulse gate biasing means associated with each register removes its block from the pulse gate of such register as soon as signals representing exchange identifying digits have been stored therein, irrespective of whether signals representing subscriber station identifying digits have been stored therein.

6. Apparatus according to claim 1 in which each register comprises a group of electronic tube elements selectively operated for energizing an output representing a digit stored therein, there being a separate group of such tube elements for each of the digits making up a telephone exchange or service code, said tube outputs being connected to switching elements of said transfer switch means and each of said switching elements being joined over common wires to corresponding switching elements in other registers.

7. Apparatus according to claim 6 in which the electronic tube elements are cold cathode tubes.

8. Apparatus according to claim 6 in which each register is also connected to the common translator by means of further switching elements and common wires and by means of common control wires.

9. Apparatus according to claim 1 in which switching operations in said transfer switches and in the common translator are performed by time spaced pulses derived from a pulse generating and pulse distributing circuit providing a continuously repeating series of pulses.

10. Apparatus according to claim 9 in which each series of pulses occurs within a period of time during which the pulse gate means of a register may be unblocked as aforesaid to pass actuating pulses therethrough, and in which each series of pulses comprises a number of pulses spaced in time and applied to separate wires by said pulse distributing circuit.

11. Apparatus according to claim 9 in which each series of pulses comprises four pulses.

12. Apparatus according to claim 9 in which the translator comprises means for selecting by at least one operation a translation corresponding to signals from a particular register supplied to its input means by said transfer switch means, and means for transferring such translation to said particular register, and in which the first pulse of the series is the actuating pulse actuating said transfer switch means, in which intermediate pulses of the series are connected to operate the translation selecting means of the translator and in which the final pulse of the series is connected to operate said translation transferring means.

13. In apparatus of the class described, in combination, an information storing register and translator means therefor comprising at least two translators connected to operate simultaneously in parallel, said two translators having their outputs commoned, forwarding means connected to said commoned outputs, said forwarding means being operable only by the sum of concurring outputs of said two translators.

14. In apparatus of the class described, in combination, an information storing register and translator means therefor comprising at least three translators connected to operate in parallel, said three transaltors having their outputs commoned, forwarding means connected to said commoned outputs, said forwarding means being operable only by the sum of concurring outputs of two of said three translators.

15. In apparatus of the class described, a plurality of information receiving and storing registers and a common translator; each register comprising digit storing counters having outputs energized selectively in accordance with the value of the digit stored therein, each register further comprising double-blocked pulse gate means, a sequence control counter and a sender counter, means controlled by the combined action of said sequence control counter and sender counter for removing a block in said pulse gate means when said register requires reference to said translator, and a group of transfer switches for each digit storage counter and for the sequence control counter of each register and having the paths therethrough controlled by the outputs of said counters, respectively, said transfer switch groups for said digit and sequence control counters having their outputs commoned with respect to like digit outputs of the several registers; an allotter counter in said common translator and associated with the pulse gate means of each of said registers for sequentially removing a second block therein; pulse generating and distributing means for generating a series of timed pulses; means for supplying one of said pulses to the pulse gates of said registers, and means connecting said pulse gate means of each register to the inputs of said groups of transfer switches; whereby said one of said pulses supplied to the gate means of said registers is transmitted, by a register gate means which is simultaneously unblocked by the allotter and by the combined action of the sequence control- and sender-counters of the register, to the inputs of said groups of transfer switches for passing through the paths thereof determined as aforesaid.

16. Apparatus according to claim 15, said common translator further comprising a memory element for each commoned output of said transfer switches, code point switch means path-controlled by the memory elements associated with the respective commoned transfer switch outputs; a translation memory tube for each digit group being translated, said memory tubes being connected to the respective output paths of said code point switch means; and means for passing a second pulse through the so-controlled code point switch means to the translation memory tube associated with the controlled path therethrough for registration therein.

17. Apparatus according to claim 16, said common translator further comprising a number of pulse actuable translation point switches each having three inputs and an output; one of the inputs of each of said translation point switches being connected to the corresponding translation memory tube output and another of them being connected to the outputs of the group of memory tubes for the sequence control counter, while the third of them is connected to a further source of actuating pulses.

18. A combination according to claim 17, said common translator further comprising a number of translation value memory tubes connected respectively to the output paths of said translation point switches and having outputs for transferring signals representing translation digits to the particular register from which the translated signals were derived; said registers each comprising translation transfer switch means connected to said translation point switch outputs, for transferring the translation to the register for transmission thereby.

19. A combination according to claim 18, the translation transfer switch of each register being pulse actuated, and each register comprising a second pulse gate connected to be unblocked by said allotter coincident with its removal of the second block from the first named pulse gate; said second pulse gate, when unblocked, passing an actuating pulse from said pulse distributor through said translation transfer switch.

20. A combination according to claim 19, said translator transfer switch being connected to control said sender counter to cause said register to send the translation digit supplied to said translation transfer switch, and also being connected to control said sequence control counter, to control the sequence of sending of the translation digit.

21. Apparatus according to claim 15, said common translator further comprising a memory element for each commoned output of said transfer switches, and a group of pulse gates connected to be unblocked selectively by the outputs of the memory elements associated with one of said digit counters of the register; code point switch means path-controlled by the memory elements associated with the other digit counters of the registers and group connected to the outputs of said group of pulse gates, respectively; translation memory tube means for each digit group being translated, said translation memory tube means being connected, respectively, to the corresponding output paths of said code-point switch means; and said translator further comprising means for supplying a second pulse to said group of pulse gates for operating the translation memory tube means corresponding to a predetermined translation of the digits indicated by the outputs of said transfer switches.

References Cited in the file of this patent

UNITED STATES PATENTS

| | | |
|---|---|---|
| 1,708,949 | Matthies | Apr. 16, 1929 |
| 2,385,228 | Ostline | Sept. 18, 1945 |
| 2,508,053 | Dehn et al. | May 16, 1950 |
| 2,535,661 | Adams et al. | Dec. 26, 1950 |

FOREIGN PATENTS

| | | |
|---|---|---|
| 527,836 | Great Britain | Oct. 17, 1940 |